(12) United States Patent
Bock et al.

(10) Patent No.: US 7,611,287 B2
(45) Date of Patent: Nov. 3, 2009

(54) SLIDE BEARING

(75) Inventors: Eberhard Bock, Morlenbach (DE); Martin Gramlich, Hirschberg (DE)

(73) Assignee: Carl Freudenberg KG, Weinheim (DE)

( * ) Notice: Subject to any disclaimer, the term of this patent is extended or adjusted under 35 U.S.C. 154(b) by 361 days.

(21) Appl. No.: 11/431,408

(22) Filed: May 10, 2006

(65) Prior Publication Data

US 2006/0263000 A1    Nov. 23, 2006

(30) Foreign Application Priority Data

May 11, 2005    (EP)    ................................... 05010174

(51) Int. Cl.
*F16C 33/10*    (2006.01)
(52) U.S. Cl. ..................... 384/399; 384/286; 384/143
(58) Field of Classification Search ......... 384/286–290, 384/322, 397–399, 429, 294, 143–147; 123/196 R
See application file for complete search history.

(56) References Cited

U.S. PATENT DOCUMENTS

| 3,929,394 A | * | 12/1975 | Hackett et al. | ............... | 384/398 |
| 4,280,456 A | * | 7/1981 | Klomp | ................... | 123/196 R |
| 6,425,689 B1 | * | 7/2002 | Herdin | ....................... | 384/322 |

FOREIGN PATENT DOCUMENTS

DE    198 18 120    11/1999

* cited by examiner

*Primary Examiner*—Thomas R Hannon
(74) *Attorney, Agent, or Firm*—Harness, Dickey & Pierce, P.L.C.

(57) ABSTRACT

A slide bearing for supporting a shaft and comprising at least one bearing shell for receiving the shaft. The bearing shell and the surface of the shaft define a bearing gap. Also described is a mechanism for supplying a lubricant to the bearing gap so that the lubricant can be removed therefrom. To compensate for negative effects of a temperature-dependent change of the bearing gap, there is provided at least one throttling element for throttling the flow of lubricant through the bearing gap.

15 Claims, 7 Drawing Sheets

SLIDE BEARING

CROSS-REFERENCE TO RELATED APPLICATIONS

This application claims the benefit of European Patent Application No. 05010174.0, filed May 11, 2005. The disclosure of the above application is incorporated herein by reference.

FIELD

The present teachings relate to a slide bearing for supporting a shaft, wherein the bearing comprises at least one bearing shell for receiving the shaft and the bearing shell and the surface of the shaft define a bearing gap. The present teachings also relate to means for supplying a lubricant to the bearing gap which can subsequently be removed from the bearing gap.

BACKGROUND

The statements in this section merely provide background information related to the present disclosure and may not constitute prior art.

Slide bearings are generally known in the art. Generally, a slide bearing includes a thrust bearing which, on a side facing a crankshaft, is provided with a bearing shell. The inside of the bearing shell and the surface of the crankshaft delimit a bearing gap through which a lubricant flows during operation. The lubricant is usually supplied through a groove centrally disposed in the bearing shell.

Generally, the shafts of internal combustion engines in motor vehicles are supported by slide bearings. For optimum lubrication, the slide bearings are supplied in most cases with oil made to flow through one of the bearing shells by an oil pump. The oil is pressed into the bearing under a certain pressure. Oil pressure is needed to provide the bearings with a sufficient supply of oil because the oil flows off into gaps required for construction-related reasons. A large radial gap causes removal of an undesirably large amount of oil and, therefore, a dangerous pressure drop in the bearing. A pressure drop can cause a lubricant film to deteriorate which may result in faster wear of the moving parts. For safe operation, therefore, a sufficiently high oil pressure in the bearing is needed.

In operation, the gap in the bearing may increase, for example, as a result of thermal expansion. To keep a constant oil pressure in the bearing, pumps with an elevated pumping power can be used to offset this increase. Problems may arise, however, in modern engines that have light-metal housings in which component parts having different thermal expansion coefficients interact.

The prior art describes the use of cast beds/cast-bed bearings in light-metal crankshaft housings for the purpose of receiving the bearing shells. This is intended to reduce the different radial widenings and thus the gap-forming process between different structural components, a process that can lead to increased lubricant outflow. Such solutions, however, are used at the expense of engine weight and they raise production costs.

DE 198 18 120 describes a slide bearing for crankshafts in which between the bearing shell and the thrust bearing there is provided a compensation system, the thermal expansion of which is greater than that of the thrust bearing. This compensation system is supposed to counteract the temperature-dependent widening of the bearing gap and thus an increase in lubricant outflow.

SUMMARY

An object of the present teachings is to provide another slide bearing of the afore-described kind in which the negative effects of a temperature-induced change of the bearing gap can be reliably prevented.

The shaft-supporting slide bearing of the present teachings comprises at least one bearing shell for receiving a shaft. The bearing shell and a surface of the shaft define a bearing gap. The bearing also includes means for supplying the bearing gap with a lubricant that can be removed from the bearing gap, and is also provided with at least one throttling element for throttling the lubricant flow through the bearing gap.

The slide bearing of the present teachings is advantageous in that it can control lubricant flow through the bearing gap relatively simply. In particular, it is possible to prevent excessive lubricant outflow caused, for example, by a temperature-induced widening of the bearing gap. Dangerous pressure drops in the bearing, therefore, are prevented or at least substantially minimized. The throttling of the lubricant flow enables a constant flow over a wide temperature range. This arrangement also advantageously allows one to omit the use of expensive, high-pressure pumps, which adapt the lubricant pressure to the dimensions of the gap. In contrast, small and inexpensive fixed-delivery pumps may be used.

Although the present teachings describe using a plurality of throttling elements, it should be understood that the present teachings also include the use of a single throttling element. Moreover, although the present teachings are described in terms of its preferred use in motor vehicle applications which use the bearing to support crankshafts, the scope of the present teachings should not be limited thereto.

The throttling elements are advantageously disposed directly in the bearing gap. That is, the throttling elements are preferably disposed in or at a region of the face and/or end faces of the bearing shell that face the crankshaft.

The throttling elements may also be disposed in and/or on the bearing shell. This arrangement allows a particularly compact design of the slide bearing.

In another embodiment of the present teachings, the throttling elements may comprise shut-off elements that may contact the crankshaft with the aid of spring elements or a pressurized liquid. Alternatively, the throttling elements can be fixed at a predetermined distance from the crankshaft. This measure ensures that the flow-through cross-section of the lubricant is kept essentially constant, particularly in a case where the bearing gap height varies. As a result, the lubricant flow-through may be essentially constant over a wide temperature range.

The present teachings, however, are not limited to the above-described shut-off elements. Also contemplated is a design where the throttling elements comprise annular disks that are disposed axially on an outer periphery of the bearing shell. In this regard, the annular disks may be provided with throttle openings that allow the lubricant to flow through.

The throttling elements may also comprise sealing lips which preferably are disposed on the outer periphery of the bearing shell and are in sealing contact with the crankshaft under elastic pressure. By orienting the sealing lips in the direction of the lubricant flow, excessive lubricant pressure can be reduced in simple manner. With increasing lubricant pressure, the sealing lips are adapted to lift or raise so that excess lubricant can escape. When the sealing lip is oriented in the opposite direction, the flow of lubricant can be switched in simple manner to the bottom shell of the bearing and, in addition, an increased throttling effect may be produced.

The following explanations refer to the throttling elements being configured as shut-off elements.

To achieve highly symmetrical compensation of a gap-forming process, at least two shut-off elements may be disposed in and/or on the bearing shell on the side facing the crankshaft on both sides of the groove for supplying the lubricant flow.

In a solution preferred from a construction standpoint, the shut-off elements may be disposed in radial grooves on the side of the bearing shell that faces the crankshaft. Advantageously, the shut-off elements in these grooves are adapted to be movable both radially and axially so that spring-loading of the shut-off elements is possible against the crankshaft and, if so desired, also against one of the inner walls of the receiving groove with mechanical means or by pressure exerted by the fluid against the crankshaft and/or the inner walls through the back side and/or lateral boundary of the shut-off elements. In addition to the pressure exerted by the fluid on the shut-off elements, additional spring-loading by mechanical spring elements can be provided. This arrangement has the advantage that the contact pressure is independent of the fluid pressure.

In a particularly preferred embodiment of the present teachings, the lubricant itself is used as the fluid for pressing the shut-off elements against the crankshaft and/or against one of the inner walls of the receiving groove. This can be accomplished in simple manner by providing a connection between the central lubricant supply and the receiving grooves for the shut-off elements. Advantageously, the shut-off elements and the receiving grooves are sized so that the lubricant can flow out of the gaps. This provides the bearing with additional lubrication.

Depending on the shape, in the above-described embodiment, the shut-off elements may have additional functions. For example, the shut-off elements may be adapted to guide the lubricant flow toward the center of the bearing. In this regard, the shut-off element may be triangular or L-shaped. The shut-off elements and the receiving grooves may also be sized so that leaving lubricant flow alone is sufficient for lubricating the bearing. In these embodiments, for example, the lubricant-supplying central groove can be omitted.

The throttling elements of the present teachings can be formed of a polymer to ensure particularly low-cost fabrication of the slide bearing.

The throttling elements may also be formed of an elastomer which would ensure particularly good adaptability of the shut-off elements to the prefabricated recesses.

The throttling elements may also be formed of a polytetrafluoroethylene compound. This material exhibits unusually low friction and high abrasion resistance. The throttling elements can also be formed of a thermoplastic material.

The slide bearing of the present teachings is preferably used in motor vehicle applications. In this regard, generally, it is preferred to provide the throttling elements of the invention at an upper part of the bearing because a lower part thereof is substantially more stressed by the cylinders disposed at the top of the engine than at the upper part of the bearing.

The slide bearing of the present teachings, however, should not be limited to the above-described use.

It should be understood that the present teachings may be developed and expanded advantageously in various ways. In connection with the explanation of the preferred embodiments of the present teachings by way of the drawings, preferred arrangements and further developments of the teachings are also explained in general fashion.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
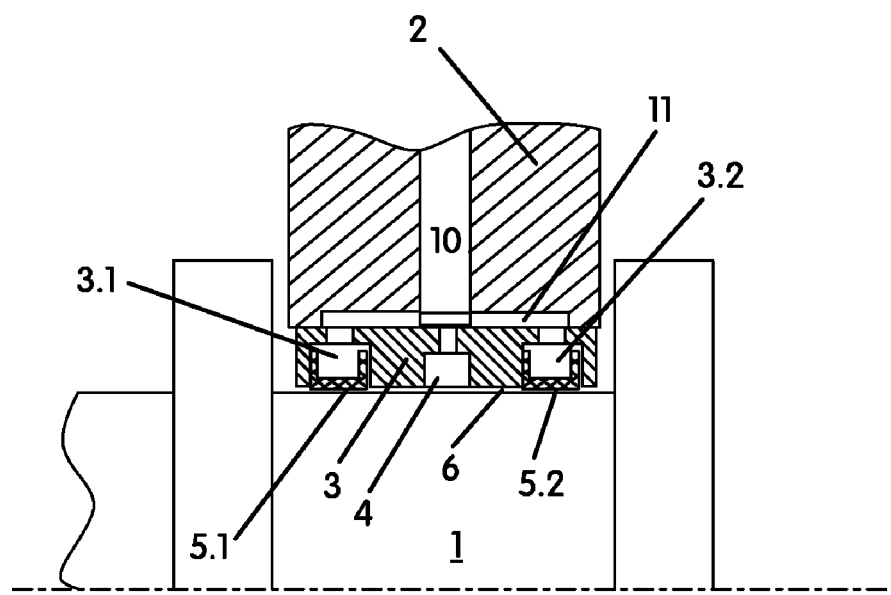
FIG. 1 shows a half-sectional presentation with a shaft and a thrust bearing as well as a bearing shell, with throttling elements being provided on both sides of the lubricant-supplying groove, wherein the throttling elements are exposable to lubricant pressure.

FIG. 1 shows a half-sectional view of crankshaft 1 which is supported in a slide bearing 2 by bearing shells 3. A lubricant is supplied to the bearing 2 by an oil supply 10 via a groove 4 in the bearing shell 3. Additional grooves 3.1 and 3.2 are provided axially to the left and right in the upper bearing shell 3, which via a linking channel 11, are also connected with the oil or lubricant supply 10. In these additional grooves 3.1 and 3.2 are located shut-off elements 5.1 and 5.2, which become pressed against crankshaft 1 by a prevailing lubricant pressure, thus closing off a bearing gap 6 toward the outside. When the bearing gap 6 increases as a result of the difference in thermal expansion coefficients between crankshaft 1 and the slide bearing 2, the shut-off elements 5.1 and 5.2 are held at the crankshaft 1 by the lubricant pressure, which causes the formation of a throttling gap that is quasi-independent of the thermal expansion. This prevents an extreme increase in the flow of lubricant through the bearing 2 because the shut-off elements 5.1 and 5.2 throttle the flow of lubricant. Without limiting the general scope, in the described embodiment, the above-indicated measure is limited to the upper shell 3 of the slide bearing 2. This already provides sufficient throttling of the lubricant flow. Excessive throttling would markedly reduce heat removal by the out-flowing lubricant.

Figure 2:
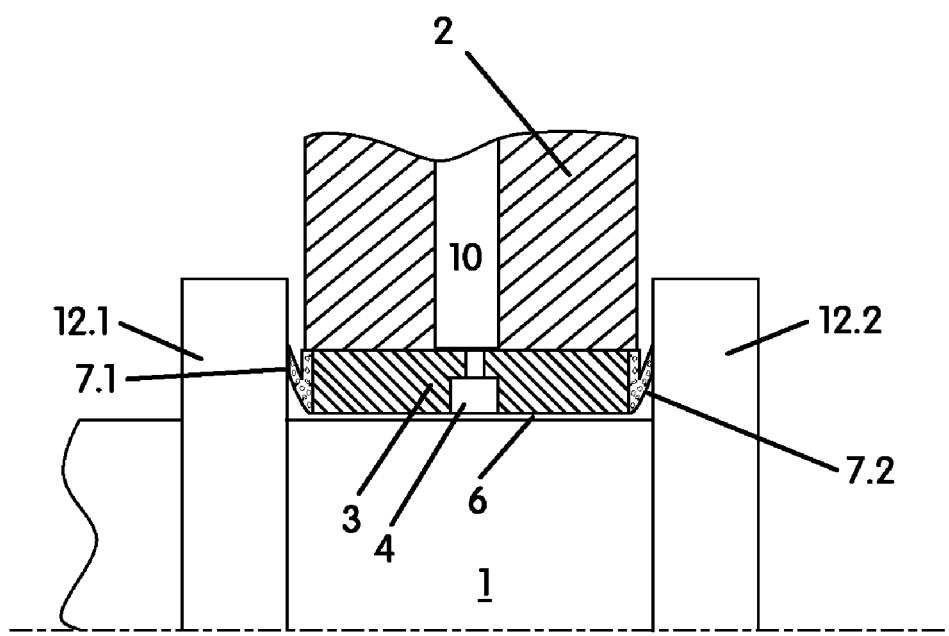
FIG. 2 shows a slide bearing in which a throttling element in the form of a sealing lip is provided between the bearing shell and the side wall of the crankshaft.

FIG. 2, like FIG. 1, shows a crankshaft 1 supported by bearing shells 3 in a slide bearing 2. The bearing 2 is supplied with lubricant via a groove 4 in the bearing shell 3. Between the bearing shell 3 and the crankshaft 1 is a bearing gap 6. At the peripheral sides of bearing shell 3 are provided sealing elements with sealing lips 7.1 and 7.2 which are sealingly disposed at side walls 12.1 and 12.2 of crankshaft 1. Sealing lips 7.1 and 7.2 are oriented radially outward (i.e., away from crankshaft 1) and act as throttles in that the sealing lips 7.1 and 7.2 can lift and allow the lubricant to escape from the bearing gap 6 in throttled manner.

Figure 3:
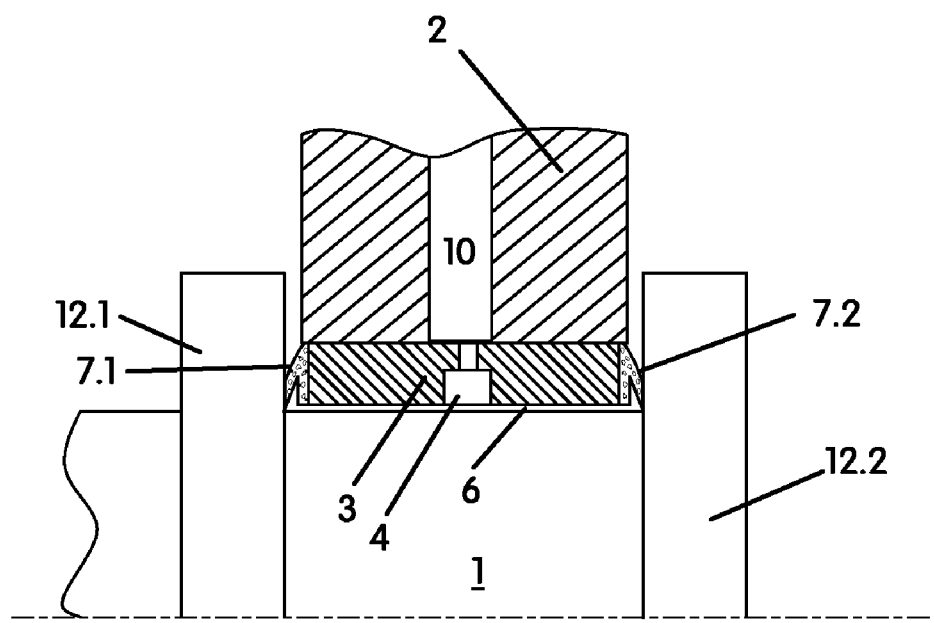
FIG. 3 shows another embodiment of the present teachings of a slide bearing wherein a throttling element is provided in the form of a sealing lip between the bearing shell and the side wall of the crankshaft.

FIG. 3 shows an arrangement similar to that of FIG. 2. In this embodiment, however, sealing lips 7.1 and 7.2 are oriented radially inward (i.e., toward crankshaft 1) thus throttling more effectively and guiding the lubricant flow to the lower bearing shell (not shown) where said flow hydrodynamically forms the required bearing gap 6 and can escape in a heat-removing manner. Because the lubricant flow on the side of the upper bearing shell 3 is absent, this embodiment is suitable primarily for movable bearings and less for fixed ones.

Figure 4:
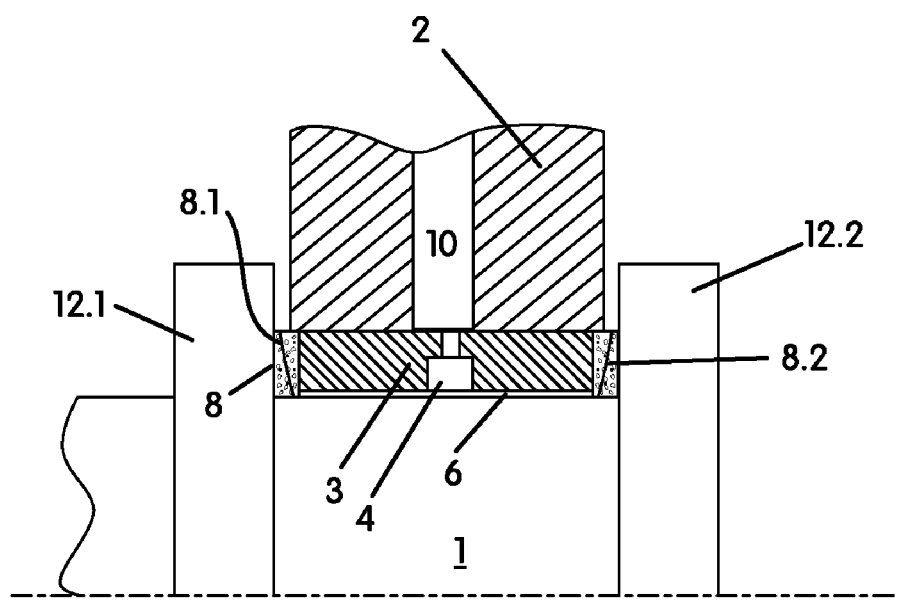
FIG. 4 shows a slide bearing wherein the throttling element is shaped in the form of an annular disk with throttle openings.

FIG. 4 shows an arrangement of a crankshaft 1 and a slide bearing 2 similar to that of FIG. 3 wherein, however, in place of the sealing lips 7.1 and 7.2 are provided, at the outer periphery of the upper bearing shell 3 and the inner periphery of the crankshaft side walls 12.1 and 12.2, closely fitting annular disks 8, each having throttle openings 8.1 and 8.2 as the throttling elements. In this embodiment, the lubricant flow can leave the slide bearing 2 in throttled manner laterally through the openings.

Figure 5:
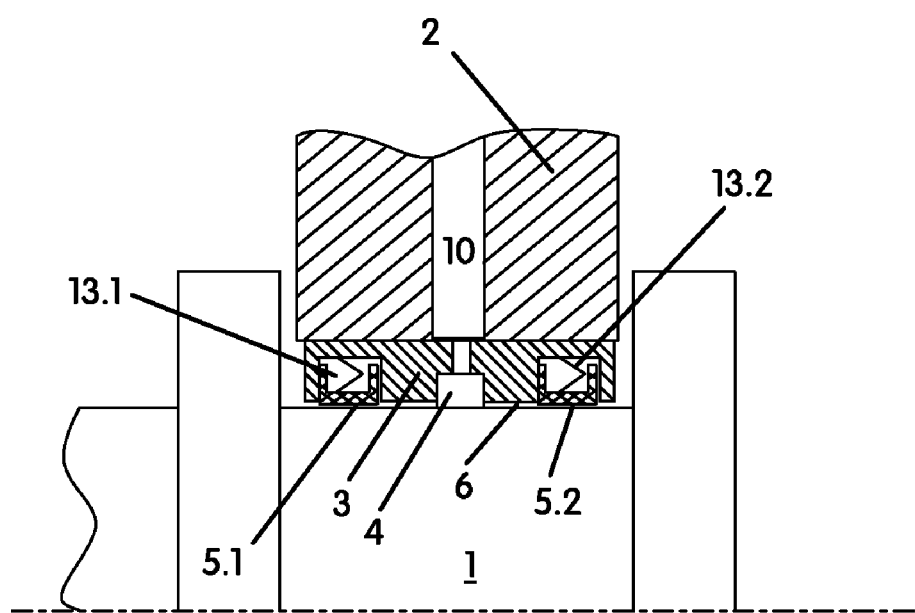
FIG. 5 shows a slide bearing similar to that of FIG. 1, wherein the shut-off elements are mechanically spring-loaded.

FIG. 5 shows an embodiment of the present teachings as in FIG. 1, with the difference that on both sides throttling elements 5.1 and 5.2 are radially pressed by springs 13.1 and 13.2 against crankshaft 1. The advantage of this embodiment lies in a lubricant-independent throttling of the lubricant flow at a constant contact pressure of the throttling elements 5.1 and 5.2 against crankshaft 1.

Figure 6:
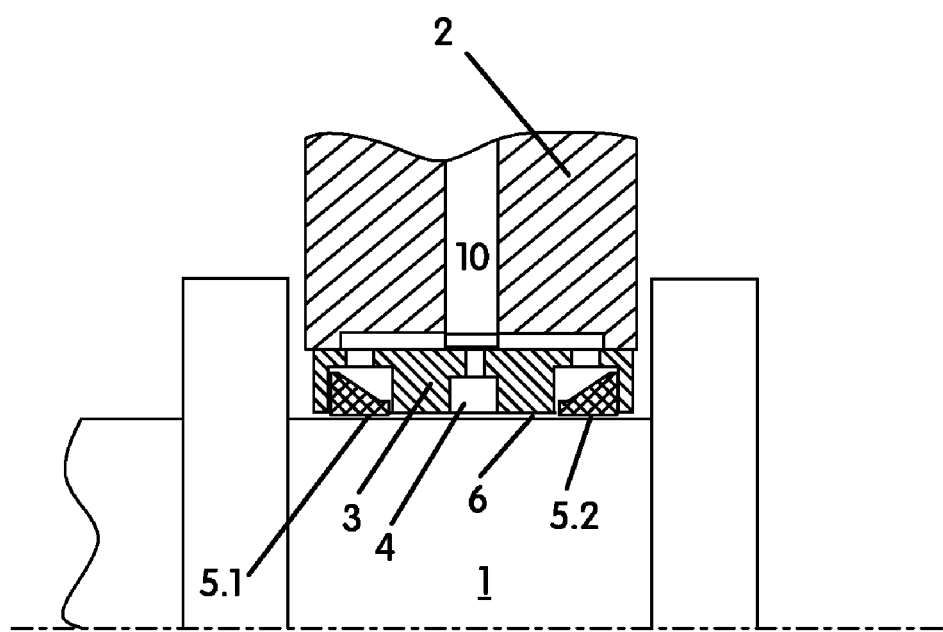
FIG. 6 shows a slide bearing similar to that of FIG. 1 wherein, for the purpose of guiding the lubricant flow toward the center and so that the throttling elements can be pressed axially outward by the lubricant pressure, the throttling elements include a triangular cross-section.

FIG. 6 shows an embodiment of the present teachings as in FIG. 1 with the difference that the throttling elements 5.1 and 5.2 have a triangular shape, and when exposed to lubricant pressure are pressed axially outward relative to an axis of shaft 1. In this manner, the lubricant can escape inward into bearing gap 6 so that, optionally, the lubricant-supplying middle groove 4 can be omitted.

Figure 7:
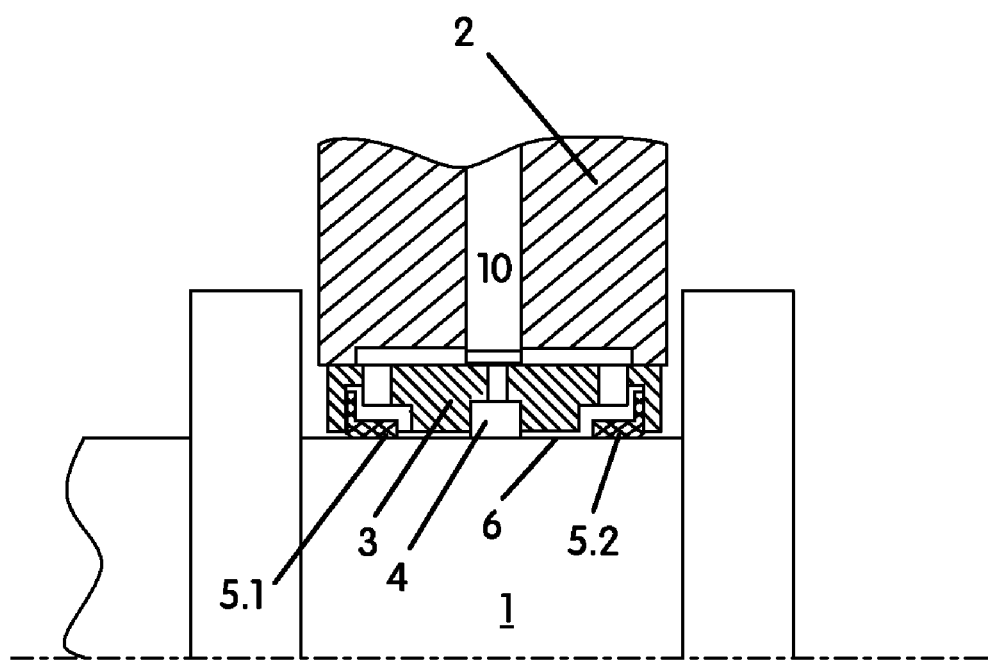
FIG. 7 shows a slide bearing similar to that of FIG. 6 wherein the shut-off elements are L-shaped.

FIG. 7 shows an embodiment of the present teachings as in FIG. 1 with the difference that the throttling elements 5.1 and 5.2 are L-shaped. The position of the throttling elements 5.1 and 5.2 in the receiving grooves 3.1 and 3.2 is determined axially by guiding grooves. When exposed to lubricant pressure, the throttling elements fit radially against the crankshaft 1 and axially against the axially oriented external walls of the receiving grooves 3.1 and 3.2. In this manner, as in the embodiment re-presented by FIG. 6, the lubricant can escape inward into bearing gap 6 so that, optionally, the lubricant-supplying middle groove 4 can be omitted.

Finally, it should be particularly stressed that the randomly selected embodiments are intended only for a discussion of the present teachings and do not limit the present teachings to these embodiments.

What is claimed is:

1. A bearing for supporting a shaft, comprising:
at least one bearing shell adapted to receive the shaft;
a bearing gap defined by said bearing shell and a surface of the shaft; and
means for supplying a lubricant to said bearing gap, said lubricant being removable from the bearing gap,
wherein at least one throttling element is provided for throttling a flow of said lubricant through said bearing gap; and
wherein said throttling element comprises at least one shut-off element disposed in a groove in said bearing shell on a side facing the shaft.

2. The bearing of claim 1, wherein said shut-off element is adapted to contact the shaft by a spring element.

3. The bearing of claim 1, wherein said shut-off element is adapted to contact the shaft by a pressurized fluid.

4. The bearing of claim 1, further comprising at least two shut-off elements disposed at said bearing shell on either side of said means for supplying said lubricant and facing the shaft.

5. The bearing of claim 4, wherein said shut-off elements are disposed in grooves in an axially and/or radially movable manner.

6. The bearing of claim 5, wherein in said grooves, to receive said shut-off elements, there are provided spring elements for spring-loading said shut-off elements.

7. The bearing of claim 4, wherein said shut-off elements in said grooves are exposed to a pressurized fluid.

8. The bearing of claim 7, wherein said grooves receiving said shut-off elements are exposed to a lubricant pressure.

9. The bearing of claim 8, wherein said shut-off elements are adapted to guide lubricant flow from said receiving grooves to a center of said bearing shell.

10. The bearing of claim 9, wherein said shut-off elements have a triangular cross-section.

11. The of claim 9, wherein said shut-off elements have a L-shaped cross-section.

12. A bearing for supporting a shaft, comprising:
a body;
a groove passing through said body and adapted to provide a lubricant to the shaft;
a bearing shell adjacent to the shaft, said bearing shell being in fluid communication with said groove and defining a bearing gap between said body and the shaft; and
a plurality of throttling elements connected to said bearing shell,
wherein said throttling elements control a flow of said lubricant through said bearing gap; and
each throttling element comprises a sealing element including a sealing lip that extends either radially outward from the shaft or radially inward toward the shaft.

13. A bearing for supporting a shaft, comprising:
a body;
a groove passing through said body and adapted to provide a lubricant to the shaft;
a bearing shell adjacent to the shaft, said bearing shell being in fluid communication with said groove and defining a bearing gap between said body and the shaft; and
a plurality of throttling elements connected to said bearing shell,
wherein said throttling elements control a flow of said lubricant through said bearing gap; and
wherein said bearing shell includes a plurality of recesses adapted to receive said throttling elements.

14. The bearing of claim 13, wherein said recesses include a spring member that presses said throttling element toward a surface of the shaft.

15. The bearing of claim 13, wherein said recesses are in fluid communication with said groove, and a pressure of said lubricant presses said throttling element toward a surface of the shaft.

* * * * *

UNITED STATES PATENT AND TRADEMARK OFFICE
CERTIFICATE OF CORRECTION

PATENT NO. : 7,611,287 B2 Page 1 of 1
APPLICATION NO. : 11/431408
DATED : November 3, 2009
INVENTOR(S) : Bock et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 393 days.

Signed and Sealed this

Twelfth Day of October, 2010

David J. Kappos
*Director of the United States Patent and Trademark Office*